US009964160B2

(12) United States Patent
Palazzolo et al.

(10) Patent No.: US 9,964,160 B2
(45) Date of Patent: May 8, 2018

(54) ACTUATOR MECHANISM FOR TRANSFER CASE

(71) Applicant: BorgWarner Inc., Auburn Hills, MI (US)

(72) Inventors: Michael Robert Palazzolo, Madison Heights, MI (US); Christopher Anthony Chirco, Romeo, MI (US); Travis J. Wentz, Oakland Township, MI (US); Paul Matthew Riggs, West Bloomfield, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days. days.

(21) Appl. No.: 15/429,637

(22) Filed: Feb. 10, 2017

(65) Prior Publication Data
US 2017/0234373 A1    Aug. 17, 2017

Related U.S. Application Data

(60) Provisional application No. 62/294,442, filed on Feb. 12, 2016.

(51) Int. Cl.
B60K 17/344    (2006.01)
F16D 23/12    (2006.01)
(Continued)

(52) U.S. Cl.
CPC ............ F16D 23/12 (2013.01); B60K 17/344 (2013.01); F16D 28/00 (2013.01); B60K 17/02 (2013.01); F16D 2023/123 (2013.01)

(58) Field of Classification Search
None
See application file for complete search history.

(56) References Cited

U.S. PATENT DOCUMENTS 5,584,776 A * 12/1996 Weilant .............. B60K 17/3505
                                                180/233
6,173,624 B1 * 1/2001 Decker ................... F16H 63/18
                                                475/269
(Continued)

FOREIGN PATENT DOCUMENTS

DE    102004015304 A1    10/2004
DE    102005051500 B3    7/2007
(Continued)

Primary Examiner — Robert W Hodge
Assistant Examiner — Ryan P Dodd
(74) Attorney, Agent, or Firm — Young Basile Hanlon & MacFarlane, P.C.

(57) ABSTRACT

A transfer case includes an input shaft, a primary output shaft, a secondary output shaft, and an actuator. The primary output shaft is coupled to the input shaft with a gear reduction mechanism. The secondary output shaft is selectively coupleable to the primary output shaft with a secondary torque transfer mechanism. The actuator includes a first actuation mechanism, a second actuation mechanism, and a driver gear assembly. The first actuation mechanism is configured to operate the gear reduction mechanism. The second actuation mechanism is configured to operate the secondary torque transfer mechanism. The drive gear assembly includes a gear plate member, a sense plate member configured to engage the first actuation mechanism, and a hub member configured to engage the second actuation. The sense plate member and the hub member are independently coupled to the gear plate member to rotate in unison with the gear plate member.

19 Claims, 10 Drawing Sheets

(51) Int. Cl.
    *F16D 28/00*     (2006.01)
    *B60K 17/02*     (2006.01)

(56) References Cited

U.S. PATENT DOCUMENTS

| | | | |
|---|---|---|---|
| 7,033,300 B2 * | 4/2006 | Mueller | B60K 17/3467 |
| | | | 475/204 |
| 7,240,577 B2 * | 7/2007 | Choi | F16H 63/18 |
| | | | 74/335 |
| 7,399,251 B2 * | 7/2008 | Mueller | B60K 17/3467 |
| | | | 475/204 |
| 8,037,984 B2 * | 10/2011 | Suzuki | F16H 61/32 |
| | | | 192/3.56 |
| 9,186,987 B2 | 11/2015 | Mastie et al. | |
| 9,447,873 B2 | 9/2016 | Pritchard | |
| 2006/0247082 A1 | 11/2006 | Mueller et al. | |

FOREIGN PATENT DOCUMENTS

| | | |
|---|---|---|
| DE | 102015222146 A1 | 5/2016 |
| DE | 102016123829 A1 | 6/2017 |

\* cited by examiner

ACTUATOR MECHANISM FOR TRANSFER CASE

CROSS-REFERENCE TO RELATED APPLICATIONS

This application claims priority to and the benefit of U.S. Provisional Application No. 62/294,442, filed Feb. 12, 2016, the disclosure of which is incorporated herein by reference in its entirety.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly, for example, during operation of the vehicle in a two-wheel drive mode, and a secondary output shaft that is driven selectively using a clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

It would be advantageous to provide a transfer case with a single actuator that both selects the drive ratio and selectively engages the secondary output shaft.

SUMMARY

A transfer case includes an input shaft, a primary output shaft, a secondary output shaft, and an actuator. The primary output shaft is coupled to the input shaft with a gear reduction mechanism selectively between a first drive ratio and a second drive ratio. The secondary output shaft is selectively coupleable to the primary output shaft with a secondary torque transfer mechanism to transfer torque from the primary output shaft to the secondary output shaft. The actuator includes a first actuation mechanism, a second actuation mechanism, a motor, and a driver gear assembly. The first actuation mechanism is configured to operate the gear reduction mechanism to couple the input shaft to the primary output shaft in the first drive ratio or the second drive ratio. The second actuation mechanism is configured to operate the secondary torque transfer mechanism to selectively transfer torque between the primary output shaft and the secondary output shaft. The drive gear assembly includes a gear plate member configured to be rotated by the motor, a sense plate member configured to engage the first actuation mechanism to operate the gear reduction mechanism, and a hub member configured to engage the second actuation mechanism to operate the secondary torque transfer mechanism. The sense plate member and the hub member are each coupled directly to the gear plate member to rotate in unison with the gear plate member.

The sense plate member may include tabs received within corresponding slots of the gear plate member to fixedly couple the sense plate member to the gear plate member. Each tab may be compressed between edges of the gear plate member defining the slot. The sense plate member may include a center aperture defined by an inner periphery, and the tabs are circumferentially spaced about the inner periphery. Each tab may be bent axially to form a slot in the inner periphery of the sense plate, and hub may include an annular body received within the center aperture of the sense plate. The annular body may include a boss corresponding to each slot and extending radially outward from the annular body into the slot corresponding therewith. The sense plate member may be a stamped steel member.

The gear plate member may be coupled to the hub member with a splined connection. The gear plate member may include a central aperture defined by an inner periphery of the gear plate member and an annular body of the hub member being press-fit into the central aperture. The gear plate member may include splines that extend inwardly from the inner periphery and are engaged with the annular body of the hub member. The splines may be formed from a material that is harder than another material forming the annular body engaged by the splines.

The motor is configured to rotate the drive gear assembly in a first range of motion in which the first actuation mechanism moves a reduction hub to select the first drive ratio and the second drive ratio, and in a second range of motion after the second range of motion in which the second actuation mechanism compresses a plate clutch of the secondary torque transfer mechanism to transfer torque from the primary output shaft to the secondary output shaft. The first actuation mechanism may be a barrel cam mechanism, and the second actuation mechanism may be a face cam mechanism. Components of the barrel cam mechanism and the face cam mechanism may generally surround the primary output shaft.

An actuator for a transfer case includes a first actuation mechanism, a second actuation mechanism, and a drive gear assembly. The first actuation mechanism is configured to operate a gear reduction mechanism of the transfer case. The second actuation mechanism is configured to operate a secondary torque transfer mechanism of the transfer case. The drive gear assembly includes a gear plate member configured to be rotated by a motor, a sense plate member configured to engage the first actuation mechanism to operate the gear reduction mechanism, and a hub member configured to engage the second actuation mechanism to operate the secondary torque transfer mechanism. The sense plate member and the hub member are each coupled directly to the gear plate member to rotate in unison with the gear plate member. The sense plate includes tabs circumferentially spaced about a planar portion thereof, and the gear plate includes slots circumferentially spaced thereabout. Each tab is through one of the slots to engage the gear plate and thereby couples the sense plate to the gear plate.

The gear plate member may be a generally planar member having a central aperture. The sense plate member may include a generally planar portion having another central aperture. The hub member may include a circumferential flange and an annular body extending from an inner periphery of the circumferential flange. The annular body of the hub member may be positioned in the central apertures of the gear plate member and the sense plate member with the sense plate member being positioned against the circumferential flange of the hub member.

The sense plate may include tabs circumferentially spaced about the planar portion. The gear plate may include slots circumferentially spaced thereabout with each tab being bent through one of the slots to engage the gear plate and thereby couple the sense plate to the gear plate. Each tab may be in compression with the slot. The gear plate member may include an inner periphery defining the central aperture with the inner periphery including splines that engage the annular body of the hub to thereby fixedly couple the gear plate to the hub member. The splines may be formed from a material that is harder than another material forming the annular body.

A drive gear assembly for an actuator of a transfer case includes a hub member, a first planar member, and a second planar member. The hub member includes a circumferential flange and an annular body extending from an inner periphery of the circumferential flange. The first planar member includes a first inner periphery, a first outer periphery, and slots. The first inner periphery defines a first central aperture and includes splines. The first outer periphery includes gear teeth. The annular body of the hub member is disposed within the first central aperture, and the splines engage the annular body to fixedly couple the first planar member to the hub member. The second planar member includes a second inner periphery, a second outer periphery, and tabs. The second inner periphery defines a second central aperture in which the annular body of the hub member is positioned. The tabs extend through the slots of the first planar member to fixedly couple the second planar member to the first planar member. The second planar member is positioned between the circumferential flange of the hub member and the first planar member.

BRIEF DESCRIPTION OF THE DRAWINGS

The description herein makes reference to the accompanying drawings, wherein like referenced numerals refer to like parts throughout several views, and wherein.

DETAILED DESCRIPTION

Figure 1:
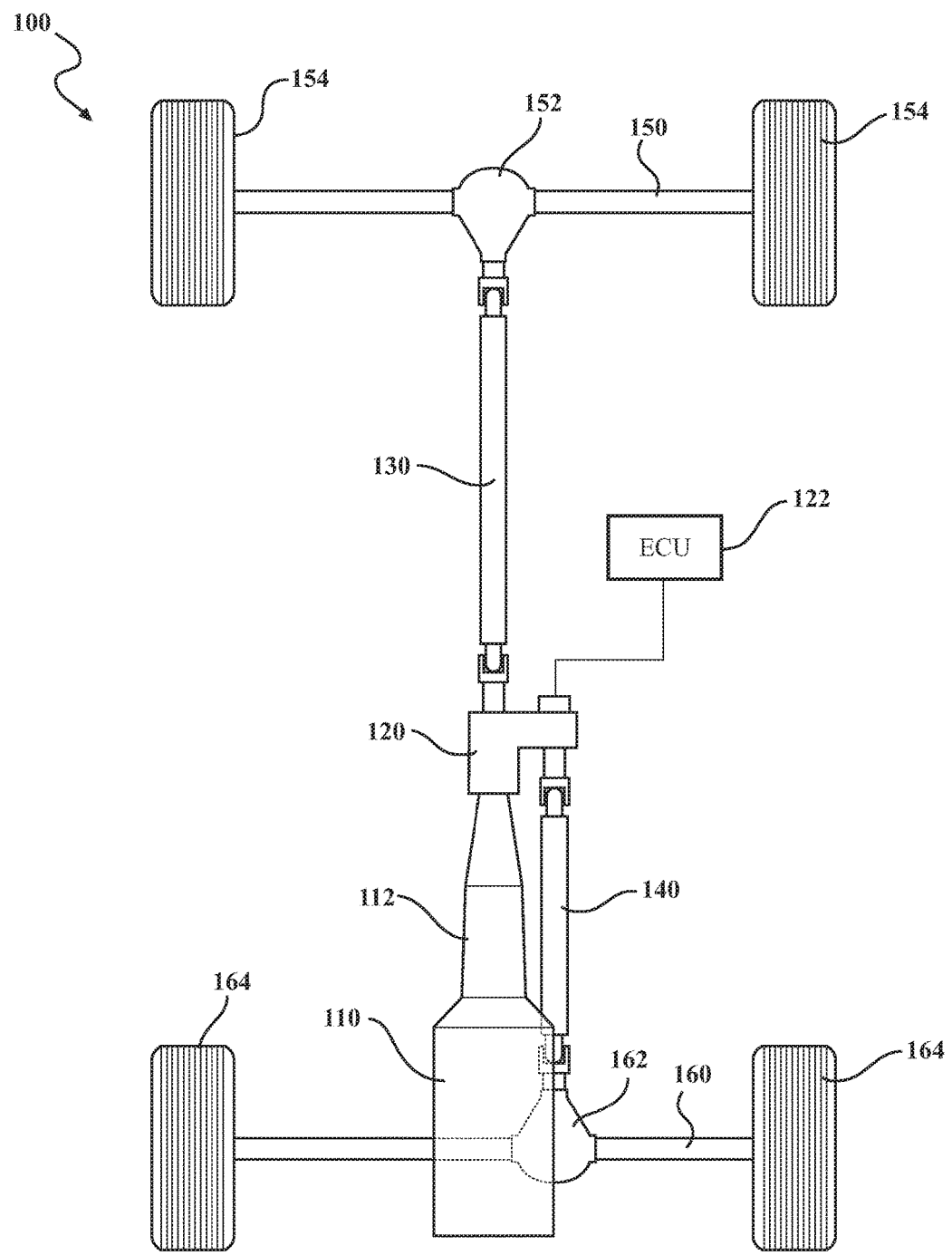
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft and the front driveshaft 140 is the secondary driveshaft. In other implementations, the front driveshaft 140 is the primary driveshaft and the rear driveshaft 130 is the secondary driveshaft, and the transfer case 120 performs a mode shift between a front-wheel drive mode and a four-wheel drive mode. In other implementations, the transfer case 120 does not include components that allow a mode shift, and the transfer case 120 constantly provides driving power to both of the rear driveshaft 130 and the front driveshaft 140.

The transfer case 120 can allow a range shift that selectively provides gear reduction to the rotational output of the transfer case 120. For example, the transfer case can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
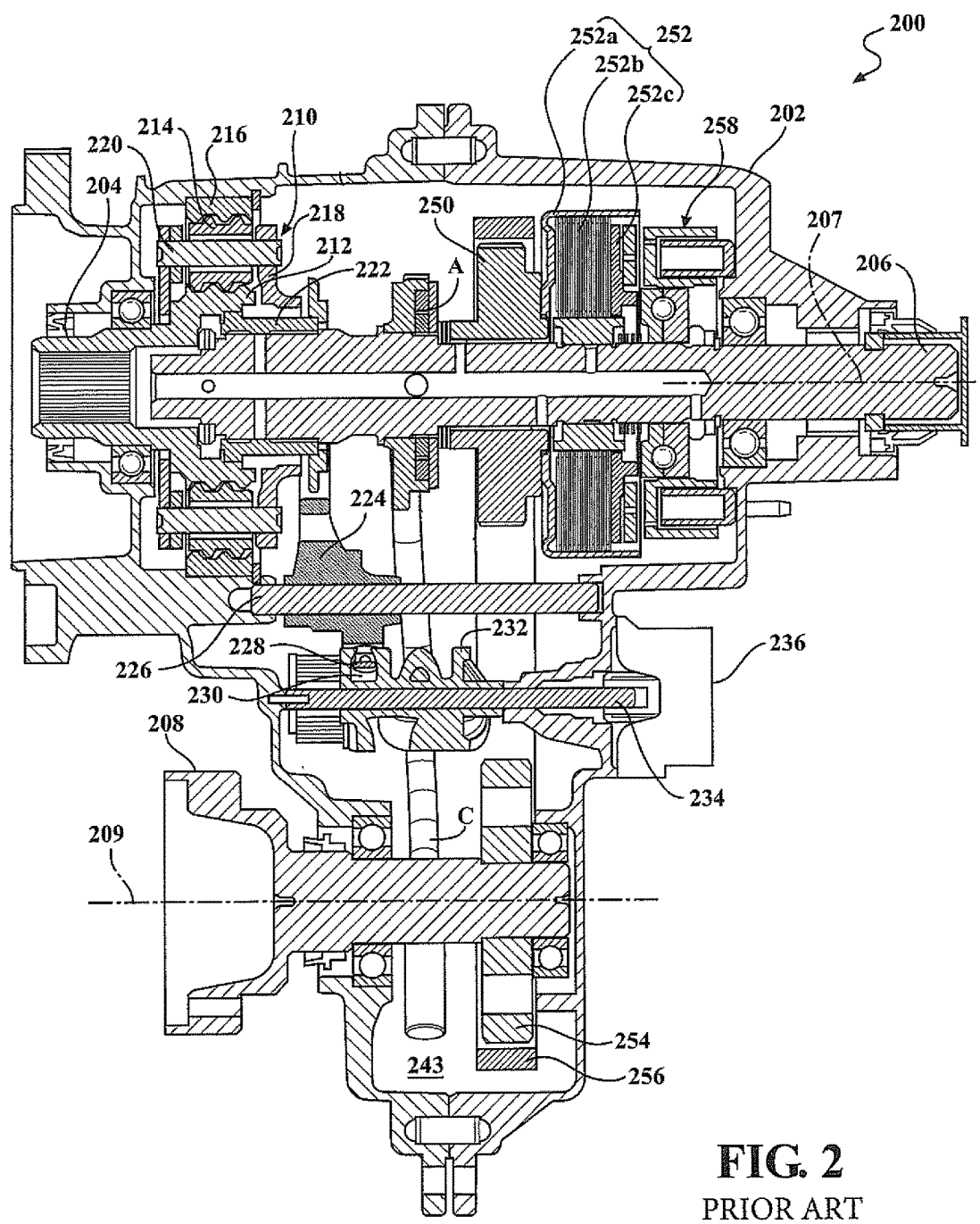
FIG. 2 is a cross-section illustration showing a transfer case having a conventional actuation system.

As shown in FIG. 2, a transfer case 200 generally includes a gear reduction system or mechanism 210 and a secondary torque transfer system or mechanism. The gear reduction system 210 is configured to transfer torque selectively at different drive ratios from an input shaft 204 to a primary output shaft 206 and is operable by a reduction actuation mechanism. The secondary torque transfer system is configured to selectively transfer torque between the primary output shaft 206 (e.g., the rear output shaft) and a secondary output shaft 208 (e.g., the front output shaft) and is operable by a torque transfer actuation mechanism. In the discussion that follows, directional terminology (e.g., front, forward, back, rearward, etc.), though referring to an orientation in which the transfer case may be installed in a vehicle (e.g., in the cross-sections shown in FIGS. 2 and 3, the left side is the front of the transfer case, while the right side is the rear of the transfer case), such directional terminology is for reference only, as other mounting orientations of the transfer cases are possible.

The transfer case 200 includes a housing 202 and rotating components including the input shaft 204, the primary output shaft 206, and the secondary output shaft 208 that each extend out of the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via the gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 (e.g., dog clutch, coupling, ring) is utilized to engage and disengage the gear reduction mechanism 210. In a first position of the gear reduction hub 222, the gear reduction hub 222 is positioned forward axially (i.e., parallel with the primary output shaft 206) to engage the input shaft 204 and the primary output shaft 206 directly, which establishes a 1:1 drive ratio and does not utilize the gear reduction mechanism 210. In a second position of the gear reduction hub 222 (not shown), the gear reduction hub 222 is shifted axially rearward away from the input shaft 204, and instead engages the planet carrier 218 and the primary output shaft 206. Driving power is thus routed through the gear reduction mechanism 210, with the planet carrier 218 rotating slower than the input shaft 204 to establish a drive ratio such as 2:1.

The reduction actuation mechanism moves gear reduction hub 222 between its first and second positions. In particular, the gear reduction hub 222 is moved by a first selector fork 224 which moves forward and rearward axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated by an electric motor 236 in response to control signals from a controller such as the ECU 122 of FIG. 1.

The secondary torque transfer mechanism is configured to transfer torque from the primary output shaft 206 to the secondary output shaft 208. A first sprocket 250 (e.g., rotating member) is arranged on the primary output shaft 206 and connected to the primary output shaft 206 by a plate clutch 252. A second sprocket 254 is arranged on the secondary output shaft 208 and is connected thereto for rotation in unison, such as by splines (not shown). The first sprocket 250 and the second sprocket 254 are connected by a chain 256, such that the secondary output shaft 208 is driven by the primary output shaft 206 via the first sprocket 250, the chain 256, and the second sprocket 254 when the plate clutch 252 is engaged.

The plate clutch 252 generally includes a housing or drum 252a, a plurality of interleaved plates 252b, a pressure or apply plate 252c, and an actuator 258. The housing 252a generally includes a radial base through which the primary output shaft 206 extends, and a concentric or annular flange extending axially away from an outer periphery of the base to form a generally cylindrical housing in which the interleaved plates 252b are positioned. The base of the housing 252a is coupled to the first sprocket 250 to cause rotation thereof, while the apply plate 252c is coupled to the primary output shaft 206 (e.g., through a splined connection) to rotate therewith. The interleaved plates 252b alternate between being engaged (e.g., splined) with the primary output shaft 206 and an inner periphery of the housing 252a. The actuator 258 is configured to press on the apply plate 252c, so as to compress the interleaved plates 252b between the apply plate 252c and the base of the housing 252a, so as to increase friction therebetween and transfer torque between the plates 252b splined with primary output shaft 206 and the plates 252b splined with the housing 252a. In this manner, torque may be selectively transferred from the primary output shaft 206 to the first sprocket 250 and ultimately the secondary output shaft 208.

Figure 3:
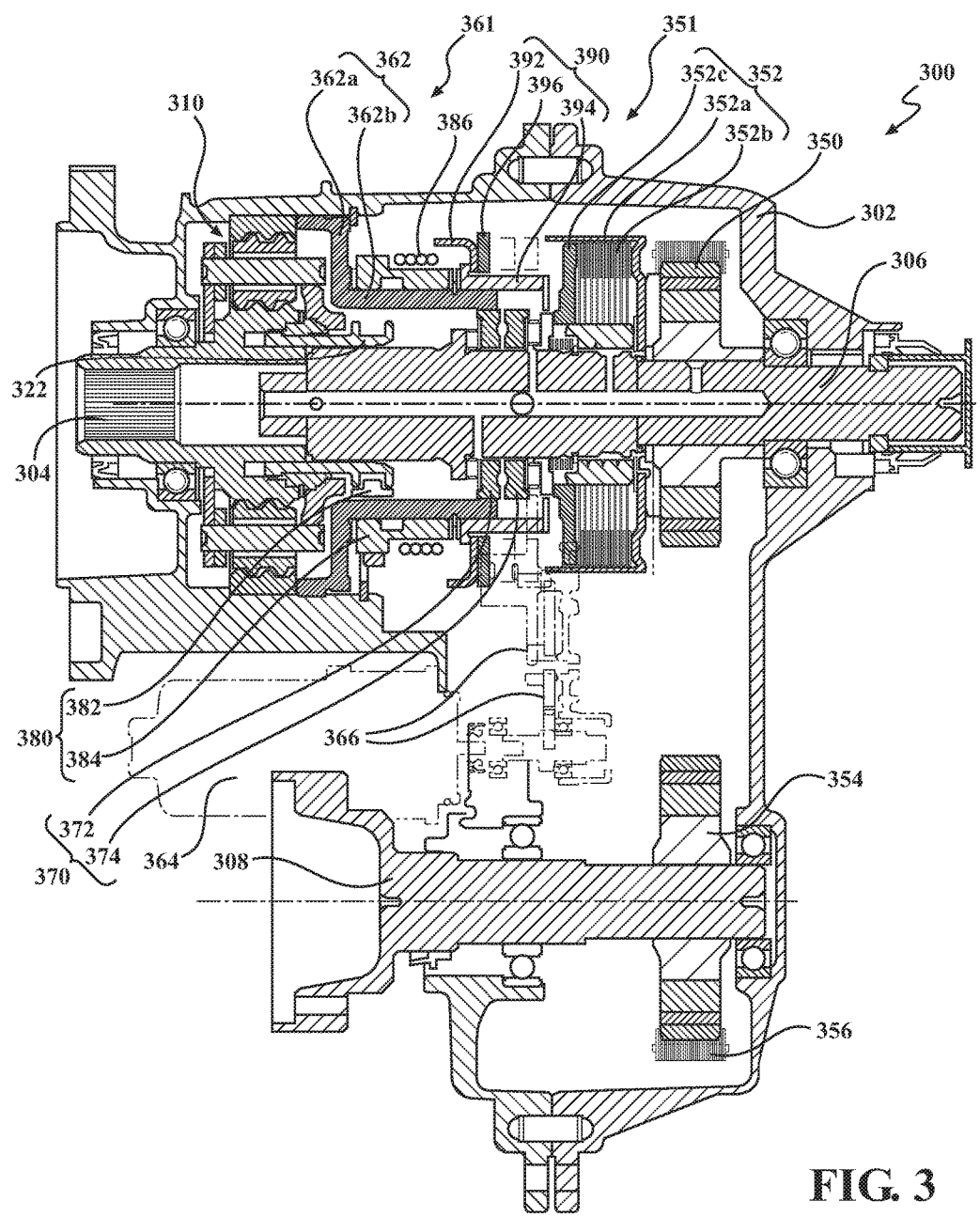
FIG. 3 is a cross-section illustration showing a transfer case having an actuation system according to an exemplary embodiment.
Figure 4:
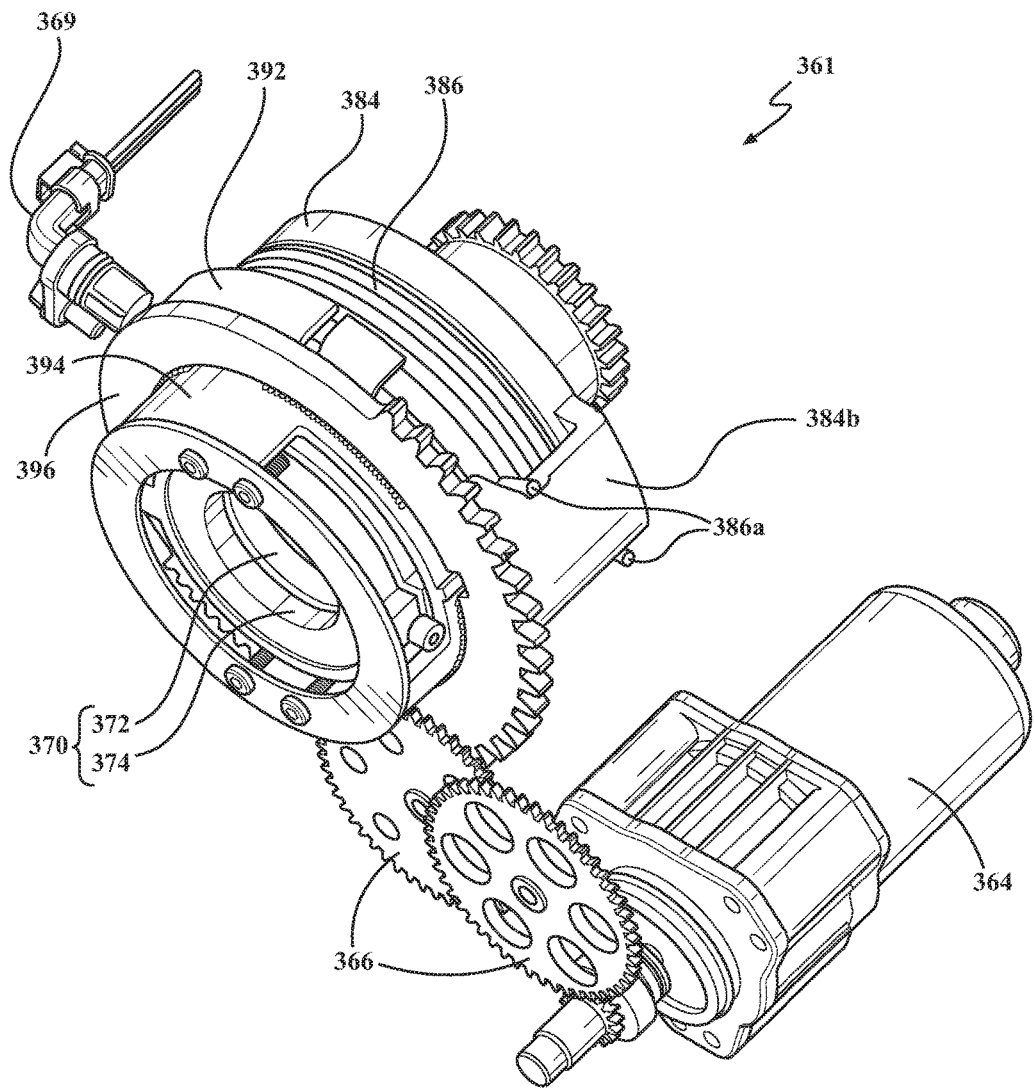
FIG. 4 is a rear perspective view of the actuation system.
Figure 5:
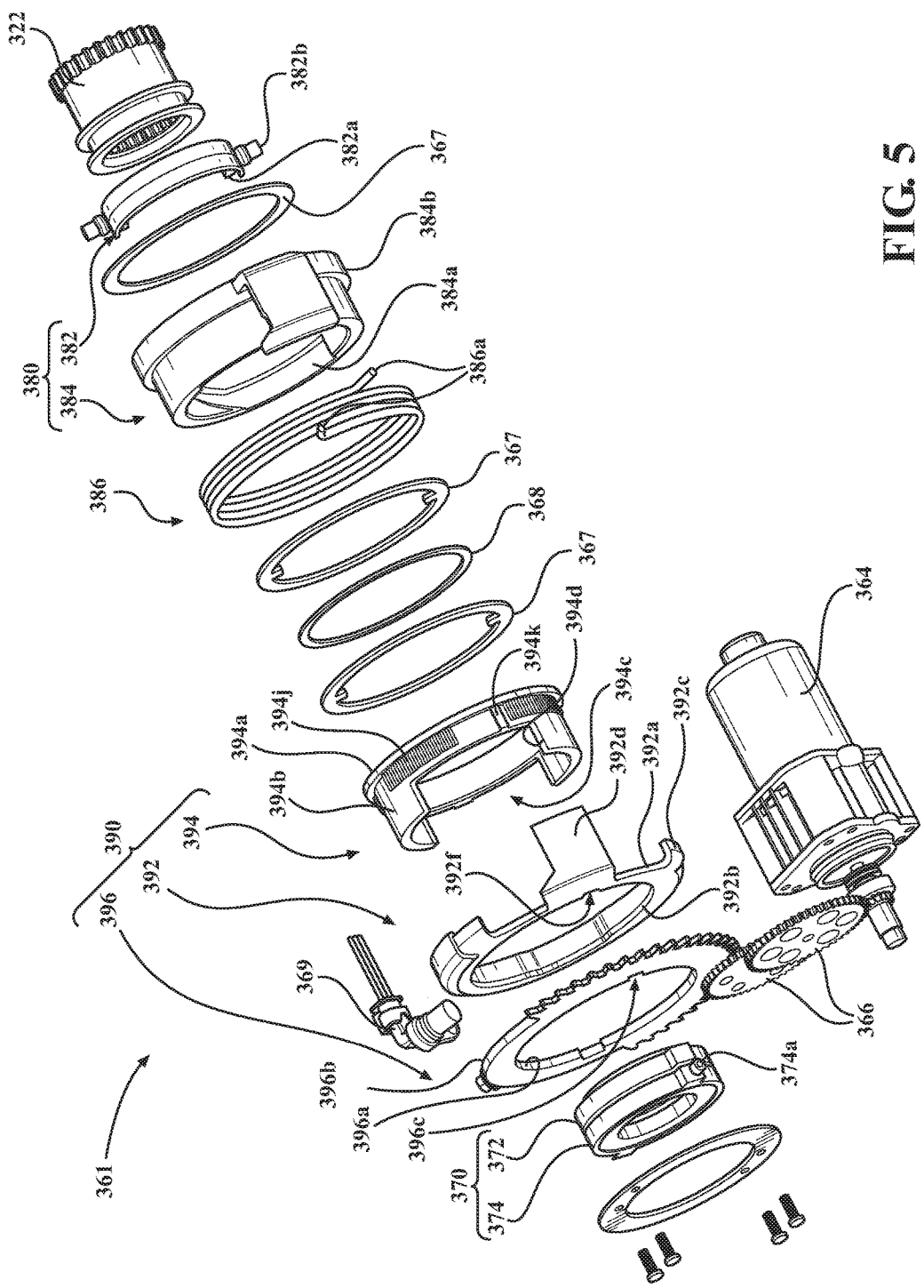
FIG. 5 is an exploded view of the actuation system.

FIG. 3 is a cross-sectional illustration showing a transfer case 300, while FIGS. 4-5 depict an actuation system 361 of the transfer case 300 in isolation. The transfer case 300 generally includes a gear reduction mechanism 310 (i.e., having a planetary gear set) and a secondary torque transfer mechanism 351 (i.e., having a first sprocket 350, plate clutch 352, second sprocket 354 coupled to a secondary output shaft 308, and chain 356), which include similar components and functionality of the gear reduction mechanism 210 and secondary torque transfer mechanism discussed previously (not all components labeled individually). The transfer case 300 also includes the actuation system or mechanism 361 that functions to operate both the gear reduction mechanism 310 and the secondary torque transfer mechanism 351. Components and assemblies of the transfer case 300 having generally the same and/or similar function as those of the transfer case 200 are generally described with common naming and numbering increasing by 100 (e.g., the gear reduction mechanism 210 and the gear reduction mechanism 310) across different embodiments.

As compared to the transfer case 200, the orientation of the plate clutch 352 and sprocket 350 of the secondary torque transfer mechanism 351 are reversed front to rear with the plate clutch 352 having its apply plate 352c facing forward and the plate clutch 352 itself being disposed forward of the sprocket 350. The actuation system 361 is generally positioned axially between the gear reduction mechanism 310 and the plate clutch 352. The actuation system 361 engages a reduction hub 322 to operate the gear reduction mechanism 310 and is further configured to engage the apply plate 352c of the plate clutch 352 to operate the secondary torque transfer mechanism 351.

As shown in FIGS. 4-5, the actuation system 361 generally includes an actuator base 362, a motor 364 with reduction gears 366, a secondary torque transfer actuator mechanism 370 (e.g., plate clutch actuator, first actuator mechanism), a gear reduction actuator mechanism 380 (e.g., dog clutch actuator, second actuator mechanism), and a drive gear assembly 390 (e.g., drive or gear plate assembly). Generally speaking, the motor 364, by way of the reduction gears 366, rotates the drive gear assembly 390, which, in turn, causes sequential (i.e., serial, staged) operation of the gear reduction actuator mechanism 380 and the torque transfer actuator mechanism 370, each stage of rotation generally being associated with one of the actuator mechanisms 370, 380. For example, a first stage is associated with the gear reduction actuator mechanism 380. In the first stage (e.g., first or initial range of motion or rotation; first positive stage and first negative stage), the drive gear assembly 390 is rotated (e.g., +/−between 30 and 50 degrees from center, such as 35 degrees) by the motor 364 via the reduction gears 366 to operate the gear reduction actuator mechanism 380, which moves the gear reduction hub or coupling 322 into the first position (e.g., high range at +35 degrees) or the second position (e.g., low range at −35 degrees). In a second stage (e.g., second, continued, or subsequent range of motion or rotation from ends of the first stage; second positive stage; and second negative stage), the drive gear assembly 390 is further rotated (e.g., +/−an additional 10-30 degrees, such as 25 degrees, meaning +35 degrees to +60 degrees and −35 degrees to −60 degrees) by the motor 364 to operate the secondary torque transfer actuator mechanism 370, which presses the clutch apply plate 352c to compress interleaved plates 352b within a clutch housing 352a. As discussed in further detail below, the torque transfer actuator mechanism 370 and gear reduction actuator mechanism 380 each include cam mechanisms, which include advance and/or retreat movement regions and/or dwell regions that, in conjunction with the drive gear assembly 390, provide for the staged operation.

According to other exemplary embodiments, the various stages of operation of the actuator system 361 may be configured differently, for example, with different ranges of motion in the first and/or second stage (i.e., greater or lesser), different bidirectional ranges for each direction of motion within a given stage (e.g., +35 degrees in the first positive stage, and −25 degrees in the first negative stage), overlapping ranges of motion between stages (e.g., +/−35 degrees in the first stage, and +30 to +60 and −30 to −60 in the second positive and negative stages), with gaps between the ranges of motion (e.g., +/−30 degrees in the first stage, and +35 to +60 and −35 to −60 in the second positive and negative stages), with additional stages (e.g., to operate other actuator mechanisms), and/or with unidirectional stages associated with one or more of the actuator mechanisms (e.g., rotation in only one direction causes the actuator mechanism to operate).

The actuator base 362 is a generally rigid, stationary member that fixedly couples the actuation system or actuator 361 to a housing 302 of the transfer case 300. The actuator base 362 generally includes a base portion 362a (e.g., a forward or radially outer portion), which couples to the housing 302 of the transfer case 300 proximate the gear reduction mechanism 310, for example, with a thrust washer, an interference fit, and/or other fasteners. The actuator base 362 also includes a generally cylindrical body or body portion 362b (e.g., a radially inner or annular portion or stem), which extends rearward axially away from the base portion 362a toward the plate clutch 352. The actuator base 362 includes a central bore (not labeled) through which a primary output shaft 306 extends. Other components of the actuation system 361 are fixedly or movably coupled to the body portion 362b as discussed below.

The motor 364, by way of the reduction gears 366, is configured to rotate the drive gear assembly 390 about the actuator base 362, which in turn causes the secondary torque transfer actuator mechanism 370 to operate the plate clutch 352 and causes the gear reduction actuator mechanism 380 to move the gear reduction hub 322. The motor 364 is fixedly coupled to, and the reduction gears 366 are rotatably coupled to the housing 302 at positions located radially outward of the primary output shaft 306.

The gear reduction actuator mechanism 380 functions as a cylindrical or barrel cam mechanism, which moves the gear reduction hub 322 between the first and second positions during the first stage (e.g., initial rotation of the drive gear assembly 390 from a center). The gear reduction actuator mechanism 380 includes a shift fork 382 and a barrel 384 (e.g., shift cam). With rotation, the barrel 384 is configured to displace the shift fork 382 forward and rearward axially within the transfer case 300, so as to move the gear reduction hub 322 between the first or forward position (i.e., in which the gear reduction hub 322 directly couples input shaft 304 and the primary output shaft 306; establishing the high range) and the second or rearward position (i.e., in which the gear reduction hub 322 couples the input shaft 304 and the primary output shaft 306 by way of the gear reduction mechanism 310; establishing the low range).

The shift fork 382 is a generally arcuate member positioned substantially within the central bore of the body portion 362b of the actuator base 362 and radially outward of the primary output shaft 306. The shift fork 382 is generally semicircular having an inner flange 382a that extends radially inward from an inner peripheral surface of the shift fork 382. The inner flange 382a is positioned between and engages radially outwardly extending, peripheral flanges of the gear reduction hub 322, such that axial movement of the shift fork 382 moves the gear reduction hub 322 axially between the first and second positions.

The shift fork 382 also includes two followers 382b configured as rollers, each extending radially outward from the outer peripheral surface of the shift fork 382 through an axially extending slot (not shown) in the body portion 362b of the actuator base 362 to be engaged by the barrel 384 (discussed below). The axially extending slot of the body portion 362b of the base maintains the shift fork 382 in a constant rotational position relative to the actuator base 362, while allowing the shift fork 382 to translate axially. The two followers 382b are positioned substantially opposite each other (i.e., approximately 180 degrees apart) at, or proximate to, ends of the shift fork 382. Each follower 382b is coupled to and rotates about an axle, which extends substantially radially outward from ends of the shift fork 382 (e.g., perpendicular to the outer peripheral surface). The shift fork 382 may additionally include a boss or protrusion for each follower 382b extending radially outward from the outer peripheral surface to which the axle is coupled.

The barrel 384 is a generally cylindrical member that surrounds the body portion 362b of the actuator base 362 and is configured to rotate thereabout to, thereby, axially move the shift fork 382. The barrel 384 includes an inner peripheral surface that bears against an outer peripheral surface of the body portion 362b of the actuator base 362. One or more thrust washers 367 and/or snap clips 368 are coupled to the outer periphery of the body portion 362b at an intermediate axial location thereof, as well as adjacent the base portion 362a. As the barrel 384 rotates about the body portion 362b of the base, edges of the barrel 384 may slide and bear against the thrust washers 367 to transfer an axial force for moving the gear reduction hub 322 relative to the actuator base 362 forward and rearward.

The barrel 384 includes an inner cam slot 384a configured to engage and axially move the shift fork 382 and, thereby, move the gear reduction hub 322 between the first and second positions. Each cam slot 384a extends radially outward from the inner peripheral surface with one of the followers 382b of the shift fork 382 being positioned in each slot 384a. Each cam slot 384a includes a movement region having opposed helically ramped surfaces that engage the follower 382b during the first movement stage (i.e., initial rotation of the barrel 384 and drive gear assembly 390 from center) to move the shift fork 382 axially forward and rearward. The movement region is flanked by dwell or flat regions in which the slot 384a maintains the follower 382b in a generally fixed axial position in the second movement stage (e.g., continued positive and negative rotation from respective ends of the first positive stage and the first negative stage) and any subsequent movement.

In order to rotate the barrel 384, the barrel 384 includes an outer radial flange or member 384b, which is positioned radially outward of an outer peripheral surface of the barrel 384 and extends axially rearward from a forward end of the barrel 384. The outer radial member 384b is engaged by a torsion spring 386, which transfers torque from the drive gear assembly 390 to rotate the barrel 384. More particularly, the torsion spring 386 is positioned between the outer peripheral surface of the barrel 384 and the outer radial member 384b and is wound about and bears against the outer peripheral surface of the barrel 384. The torsion spring 386 includes two ends 386a that extend radially outward to engage axially-extending edges of the outer radial member 384b and to engage the drive gear assembly 390 to transfer torque therebetween. In the case of a blocked shift event (i.e., when splines of the reduction hub 322 engage ends of splines of the input shaft 304 or planet carrier [not shown, refer to gear reduction mechanism 210 above] of the gear reduction mechanism 310), the torsion spring 386 allows for relative rotational motion between the barrel 384 and the drive gear assembly 390, while storing energy that causes axial movement of the reduction hub 322 once properly aligned with the input shaft or gear reduction mechanism 310.

The secondary torque transfer actuator mechanism 370 functions as a face cam mechanism (e.g., is a face cam mechanism, such as a ball ramp mechanism) to convert continued rotation of the drive gear assembly 390 into axial movement for operating the plate clutch 352 within the second stage of rotational movement (e.g., continued rotation from approximate ends of the first stage). The secondary torque transfer actuator mechanism 370 includes a forward member 372 (e.g., first plate, ring, or cam member) and a rearward member 374 (e.g., second plate, ring, or cam member), which are configured for relative rotation therebetween and resultant relative axial displacement for engaging the plate clutch 352. Both the forward member 372 and the rearward member 374 include central apertures or bores through which the primary output shaft 306 extends. The forward member 372 is coupled to a rearward end of the body portion 362b of the actuator base 362, while the rearward member 374 is configured to both rotate and move axially relative to the forward member 372 and, thereby, move the actuator base 362. For example, as shown, the forward member 372 is positioned within the central bore extending through the body portion 362b of the actuator base 362 and may be coupled thereto by a press-fit, interference fit, or splined connection. The forward member 372 is positioned against a bearing member coupled to the output shaft 306 to prevent forward axial movement thereof. The rearward member 374 is configured to be rotated by the drive gear assembly 390 relative to the forward member 372, as discussed in further detail below, and is positioned to press the apply plate 352c via an intermediate bearing. The intermediate bearing allows the apply plate 352c to spin with the output shaft 306 independent of the rearward member 374, which rotates back and forth within a limited range of motion of the second stage.

At least one of the forward member 372 or rearward member 374 includes an inner surface (i.e., facing the other plate; not shown) that includes two movement advance regions that are helically ramped in opposite directions. Each of a plurality of followers or rollers (e.g., balls) bear against the inner surfaces of both members 372, 374, such that rotation of the rearward member 374 from a center causes the rearward member 374 to displace rearward axially to engage the apply plate 352c of the plate clutch and, thereby, operate the secondary torque transfer mechanism 351. As discussed below, the drive gear assembly 390 is configured to not engage the followers 374a during the first movement stage (e.g., initial rotation of the drive gear assembly 390 from center), so as to not operate the secondary torque transfer actuator mechanism 370. However, the forward and rearward members 372, 374 may instead or additionally include dwell regions for the first movement stage in which rotation does not cause axial movement of the rearward member 374 and/or any subsequent movement stage.

In order to rotate the rearward member 374 relative to the forward member 372, the rearward member 374 is configured to receive application of one or more tangential forces from the drive gear assembly 390 (discussed in further detail below). The rearward member 374 includes one or more followers 374a configured as rollers extending radially outward from a periphery of the rearward member 374. For example, the rearward member 374 may include two followers 374a that are positioned substantially opposite each other (i.e., approximately 180 degrees apart). Each follower 374a is coupled to and rotates about an axle, which extends radially from the periphery of the rearward member 374 (e.g., perpendicular to an outer surface thereof). The rearward member 374 may additionally include a boss or protrusion for each follower 374a extending radially outward from the periphery of the rearward member 374 to which the axle and follower 374a are coupled.

As mentioned previously, the drive gear assembly 390 is configured to be rotated by the motor 364 via the reduction gears 366 in order to operate the secondary torque transfer actuator mechanism 370 and the gear reduction actuator mechanism 380. The drive gear assembly 390 generally includes a sense plate 392 (e.g., a first plate), hub 394 (e.g., actuator member), and gear plate 396 (e.g., a second plate), which are fixedly coupled to each other to be rotated in unison by the motor 364. When the motor 364 drives the gear plate 396 by way of the reduction gears 366, the hub 394 engages the followers 374a to operate the secondary torque transfer actuator mechanism 370, and the sense plate 392 engages the torsion spring 386 to operate the gear reduction actuator mechanism 380. The drive gear assembly 390 is positioned about the actuator base 362 with an inner peripheral surface of the hub 394 bearing on the outer peripheral surface of the body portion 362b of the actuator base 362. The drive gear assembly 390 is held axially on the actuator base 362 between one of the thrust washers 367 and an end plate coupled to the body portion 362b of the base 362. While the drive gear assembly 390 may alternatively be provided as a single component or two primary components, an assembly of the sense plate 392, hub 394, and gear plate 396 may provide for less complicated manufacturing, while allowing each component to be configured individually (e.g., to optimize material type according to strength, weight, and cost considerations).

The gear plate 396 is configured to receive an input torque from the motor 364 via the reduction gears 366 through a first movement stage, second movement stage, and any subsequent movement stages of the drive gear assembly 390. The gear plate 396 is a unitary, generally planar member having a central bore or aperture defined by an inner periphery 396a and an outer periphery 396b. The primary output shaft 306, along with other components of the actuator 361, extends through the central aperture. The outer periphery 396b includes a plurality of teeth that mesh with mating teeth of the reduction gears 366, so as to be rotated by the motor 364. Because the actuator 361 operates within a limited range of rotational motion in the first and second movement stages (e.g., +/−60 degrees), as described above for operating both the secondary torque transfer actuator mechanism 370 and the gear reduction actuator mechanism 380, only a portion of the outer periphery 396b (e.g., 180 degrees) may include teeth. The gear plate 396 may, for example, be made from powdered metal steel and, as discussed in further detail below, may include various features to facilitate coupling to the sense plate 392 and/or hub 394.

The sense plate 392 is configured to be driven by the gear plate 396 for operating the gear reduction actuator mechanism 380. The sense plate 392 may also be configured with a position sensor 369 for monitoring the rotational position of the actuator 361. The sense plate 392 is a unitary member, which generally includes a planar portion 392a with a central bore or aperture defined by an inner periphery 392b, and also includes first and second annular flanges 392c, 392d, which extend forward axially from an outer periphery of the planar portion 392a. In the drive gear assembly 390, the planar portion 392a is positioned forward of and adjacent to a forward surface of the gear plate 396. The first flange 392c extends substantially circumferentially (e.g., approximately 270 degrees) about the outer periphery of the planar portion 392a. The second flange 392d is configured relative to the outer radial member 384b of the barrel 384 to transfer torque therebetween via the torsion spring 386. More particularly, the second flange 392d is positioned between the circumferential ends of the first flange 392c and has a width that is complementary to the width of the outer radial member 384b of the barrel 384, such that both the outer radial member 384b of the barrel cam 384 and the second flange 392d of the sense plate 392 are positioned between and engaged by the ends 386a of the torsion spring 386. The second flange 392d is additionally, positioned radially between the coil of the torsion spring 386 and the outer radial member 384b of the barrel cam 384. The sense plate 392 may, for example, be made from stamped steel, and as discussed in further detail below, may include various features to facilitate coupling to the hub 394 and/or gear plate 396.

The hub 394 is configured to be driven by the gear plate 396 to operate the secondary torque transfer actuator mechanism 370, for example, in limited ranges of motion of the drive gear assembly 390. During the first movement stage (e.g., initial rotation from center in which the secondary torque transfer actuator mechanism 370 moves the gear reduction hub 322, as discussed previously), the hub 394 rotates freely of the secondary torque transfer actuator mechanism 370, so as to not engage the plate clutch 352. During continued rotation in the second movement stage (e.g., continued positive and negative rotation from respective ends of the first stage), the hub 394 engages the secondary torque transfer actuator mechanism 370. The hub 394, for example, rotates about a common axis with the rearward member 374 (e.g., the axis of the primary output shaft 306).

The hub 394 is a unitary member, which generally includes a base portion 394a (e.g., radial flange) with a central aperture, and includes an annular body 394b extending axially from an inner periphery of the base portion 394a, which rotates about and bears against the body portion 362b of the actuator base 362. As part of the drive gear assembly 390, the annular body 394b extends rearward through the central apertures of the sense plate 392 and gear plate 396 with the sense plate 392 being held between the base portion 394a of the hub 394 and the gear plate 396. The hub 394 may, for example, be made from powdered metal steel. and, as discussed in further detail below, may include various features to facilitate coupling to the sense plate 392 and/or gear plate 396.

The hub 394 additionally defines slots or cutouts 394c in the annular body 394b in which the followers 374a of the secondary torque transfer actuator mechanism 370 are positioned (see, e.g., FIG. 6). Each slot 394c is defined between two circumferentially opposed end walls or tracks 394d of the annular body 394b, which extend axially rearward. The slots 394c are sized equally and are circumferentially spaced according to spacing of the followers 374a to provide simultaneous engagement of the followers 374a during rotation of the drive gear assembly 390. During the first movement stage, the followers 374a each remain in a middle region of the slot 394c between the opposed end walls 394d. With continued rotation in the second movement stage, each of two end walls 394d, one from each slot 394c, simultaneously engage and apply a tangential force to one of the followers 374a to rotate the rearward member 374 of the secondary torque transfer actuator mechanism 370. With this rotation, the rearward member 374 displaces axially rearward from the forward member 372 (i.e., so as to compress the plate clutch 352), while the followers 374a roll rearward along the opposed end walls 394d. The end walls 394d have an axial length allowing the followers 374a to travel thereon through the full range of axial displacement of the secondary torque transfer actuator mechanism 370.

As referenced above, the drive gear assembly 390 includes the sense plate 392, hub 394, and gear plate 396, which are fixedly coupled together to rotate in unison as a single unit. According to the embodiment shown in FIGS. 3-5, the sense plate 392, hub 394, and gear plate 396 are coupled together via a press-fit, splined arrangement. More particularly, the annular body 394b (e.g., inner peripheral flange) of the hub 394 is configured to be inserted into the central bore of the sense plate 392 and the central bore of the gear plate 396. The diameter of the outer surface of the annular body 394b of the hub 394 nominally has an outer diameter that is slightly smaller than the inner diameters of the inner peripheries 392b and 396a of the sense plate 392 and gear plate 396, respectively. The annular body 394b includes a plurality of coupling splines 394j extending axially and protruding radially outwardly from the outer surface in one or more regions to tightly engage and couple to the inner peripheries 392b and 396a of the sense plate 392 and gear plate 396. The coupling splines 394j may, for example, be configured to deform or cut material forming the inner peripheries 392b and 396a as the sense plate 392 and gear plate 396 are pressed successively onto the annular body 394b of the hub 394. The annular body 394b may additionally include one or more alignment splines 394k extending axially and protruding radially outwardly from the outer surface at one or more locations to be received within alignment slots 392f and 396c of the sense plate 392 and gear plate 396, respectively. During operation, the motor 364 engages and rotates the gear plate 396 by way of the reduction gears 366, which transfers torque to the hub 394 by way of the splined connection, which in turn transfers torque to the sense plate 392 by way of the splined connection.

According to other exemplary embodiments, rather than the gear plate assembly 390 having the hub 394 being an intermediate component by which torque is transferred from the gear plate 396 to the sense plate 392, a drive gear assembly 490 may instead have a sense plate 492 that is connected directly to a gear plate 496, as shown in FIGS. 6A-6E. A hub 494 is coupled directly to the gear plate 496, for example, such that the sense plate 492 and the hub 494 are each coupled to the gear plate 496 directly and/or substantially independent of the other. By providing a direct connection between the sense plate 492 and the gear plate 496, the hub 494 may be more optimally configured according to its use for actuating the secondary torque transfer actuation mechanism (not shown; refer to actuation mechanism 370 and secondary torque transfer mechanism 351 discussed previously), as opposed to also functioning as an intermediate torque carrier between the gear plate 496 and the sense plate 492 (e.g., providing a sufficiently strong connection to transfer torque from the sense plate 492 to the gear plate 496 during a blocked shift event when changing between high and low drive ratios; refer to discussion of gear reduction hub 322 above). For example, the hub 494 may, thereby, have lower strength requirements, allowing the use of less, lighter weight, and/or less expensive materials, such as unhardened steel, light metals, composites, and/or polymers, while the gear plate 496 is made from a powdered metal steel and the sense plate 492 is a mild steel stamping.

The sense plate 492 is generally configured similar to the sense plate 392 by including a planar portion 492a, an inner periphery 492b, along with flanges 492c, 492d, while the hub 494 is generally configured similar to the hub 394 by including a base portion 494a (e.g., radial flange) and an annular body 494b, and the gear plate 496 is configured similar to the gear plate 396 by having an inner periphery 496a and an outer periphery 496b. As with the hub 394, the hub 494 may define a slot 494c having end walls that engage followers 374a of the secondary torque transfer actuation mechanism 370 for operation thereof. As with the flange 392d of the sense plate 392, the flange 492d of the sense plate 492 may engage the torsion spring 386 of the gear reduction actuator mechanism 380 for operation thereof.

The sense plate 492 additionally includes a plurality of tabs 492f (e.g., circumferentially-spaced inner peripheral tabs or tangs) that are received within slots 496d (e.g., corresponding circumferentially-spaced slots) of the gear plate 496. The tabs 492f, thereby, fixedly couple the sense plate 492 directly to the gear plate 496 and transfer torque therebetween. The gear plate 496 additionally includes splines 496e on the inner periphery 496a, which engage the annular body 494b of the hub 494 to thereby couple the gear plate 496 to the hub 494 and transfer torque therebetween. The foregoing features of the tabs 492f and slots 496d, along with the splines 496e, are discussed in turn below.

Figure 6A:
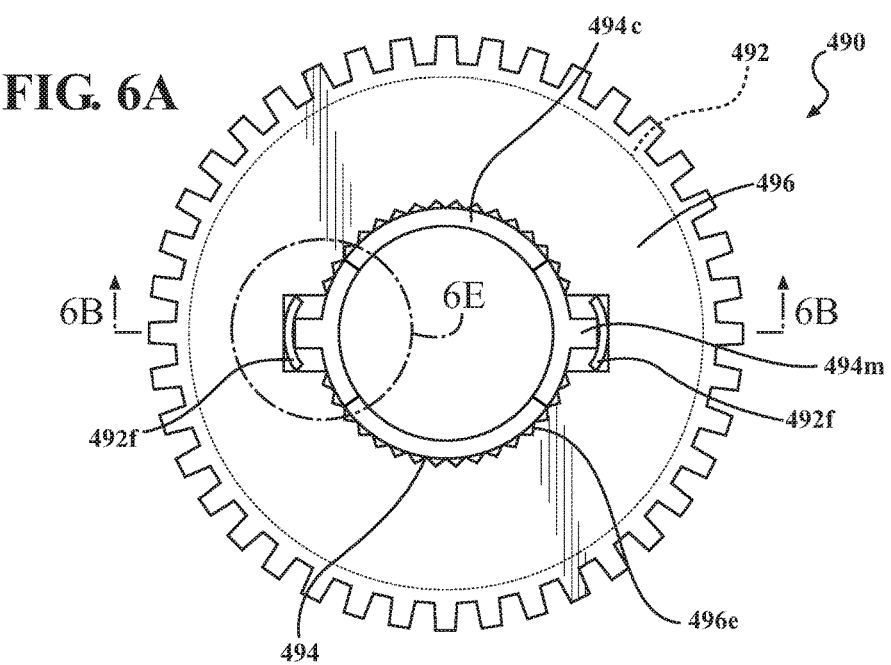
FIG. 6A is a plan view of a drive gear assembly of an actuation system for a transfer case according to an exemplary embodiment.
Figure 6B:
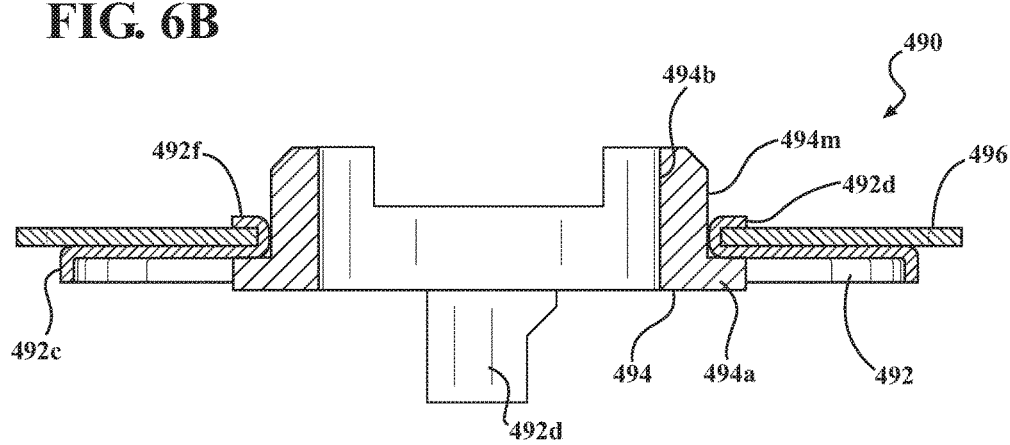
FIG. 6B is a cross-sectional view taken along line 6B-6B in FIG. 6A showing the drive gear assembly in a second state.
Figure 6C:
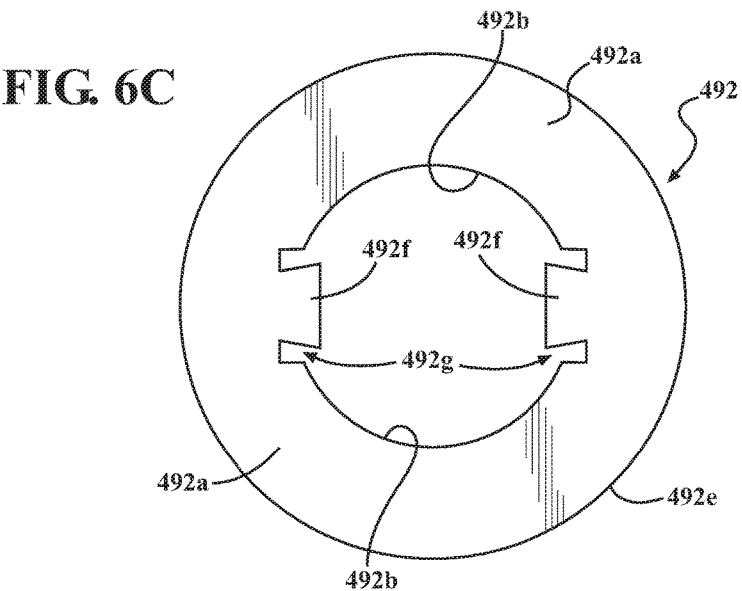
FIG. 6C is a plan view of a sense plate member of the drive gear assembly according to the embodiment shown in FIG. 6A.

As shown in FIG. 6C, each tab 492f of the sense plate 492 protrudes radially from the planar portion 492a, originating from a region positioned radially outward of the inner periphery 492b (i.e., toward an outer periphery 492e) of the planar portion 492a and extending radially inward past the inner periphery 492b. The tabs 492f are integral with the sense plate 492, for example, being formed in the material of the sense plate 492 during a stamping or machining operation. Prior to, or during connection of the sense plate 492 to the gear plate 496, the tabs 492f are bent in an axial direction opposite the flanges 492c, 492d, so as to be receivable or received within the slots 496d of the gear plate 496. With the tab 492f bent and originating radially outward of the inner periphery 492b of the planar portion 492a, the inner periphery 492b defines a slot 492g in the void left by the tab 492f. According to other exemplary embodiments, each tab 492f may be configured differently (e.g., extending radially to terminate prior to passing the inner periphery 492b of the sense plate or extending radially inward directly from the inner periphery 492b of the sense plate 492).

To bend each tab 492f into a corresponding slot 494d, the hub 494 may include a boss 494m protruding radially outward from the annular body 494b. During an assembly process in which the sense plate 492 and gear plate 496 are simultaneously received and/or pressed onto the annular body 494b of the hub 494, the boss 494m functions to engage one of the tabs 492f of the sense plate 492 and bends the tab 492f into the slot 496d (e.g., corresponding slot) of the gear plate 496. A secondary pressing or bending operation may additionally be used to bend the tabs 492f further radially outward, for example, to engage a planar surface of the gear plate 496 (see FIG. 6B). The boss 494m may thereafter remain engaged with the tab 492f and/or in the slot 492g of the sense plate. According to other exemplary embodiments, the sense plate 492 may be coupled to the gear plate 496 prior to coupling to the hub 494, for example, with the tabs 492f being bent and inserted into the slots 496d prior to the subassembly of the sense plate 492 and the gear plate 496 being pressed on to the annular body of the hub 494.

The tabs 492f and slots 496d may also be cooperatively configured to maintain constant engagement to prevent relative rotation (e.g., backlash) between the sense plate 492 and gear plate 496. As shown in FIGS. 6A and 6E, each tab 492f of the sense plate 492 engages and is compressed between edges of the gear plate 496 that define the slot 496d. The tabs 492f thereby maintain constant contact with the edges of the slots 496d in a circumferential direction to prevent relative rotational movement between the sense plate 492 and the gear plate 496. Comparing FIG. 6C to FIG. 6D, each tab 492f of the sense plate 492 has a greater nominal width than the slot 496d of the gear plate 496, thereby allowing the sense plate 492 to be preloaded or compressed (e.g., elastically bent) within the slot 496d (see FIGS. 6A and 6E). For example, the tab 492f may be tapered, flaring wider when moving radially inward, such that the nominal width of the tab 492f where the tab 492f engages the slot 496d is wider than the slot 496d (i.e., wider than a distance between the edges of the gear plate 496 that define the slot 496d). The width of the tab 492f at radially outer locations may be less than or equal to the width of the slot 496d to facilitate receipt of the tab 492f within the slot 496d. According to still other exemplary embodiments, each tab 492f may be configured so as to not be preloaded within the slot 496d (e.g., having a constant width that is less than or approximately equal to the width of the slot 496d within which it is received).

To facilitate compressing or preloading the tabs 492*f* within the slots 496*d*, the bosses 494*m* of the hub 494 engage the tabs 492*f* during a pressing operation. While the sense plate 492 and gear plate 496 are simultaneously pressed onto the annular body 494*b* of the hub 494, the bosses 494*m* press against a central portion of the tab 492*f*, while edges of the slot 496*d* apply a reaction force against edges of the tab 492*f* and cause the tab 492*f* to bend or wrap partially around the boss 494*m*. In the finished drive gear assembly 490 (e.g., plate, gear, or drive assembly), each boss 494*m* may remain positioned within and against the compressed tab 492*f*, which forms a concave surface facing radially inward (i.e., as shown in FIG. 6E), or the tabs 492*f* may be bent further (e.g., during a secondary pressing operation) so as to engage the planar surface of the gear plate 496 (as shown in FIG. 6B). According to other assembly methods, the tabs 492*f* may be preloaded or compressed with the slots 496*d* without use of the hub 494, for example, each tab 492*f* may be inserted and compressed within the slot 496*d* prior to coupling the subassembly of the sense plate 492 and the gear plate 496 to the hub 494 (e.g., forming a concave surface facing radially inward or radially outward).

Figure 6D:
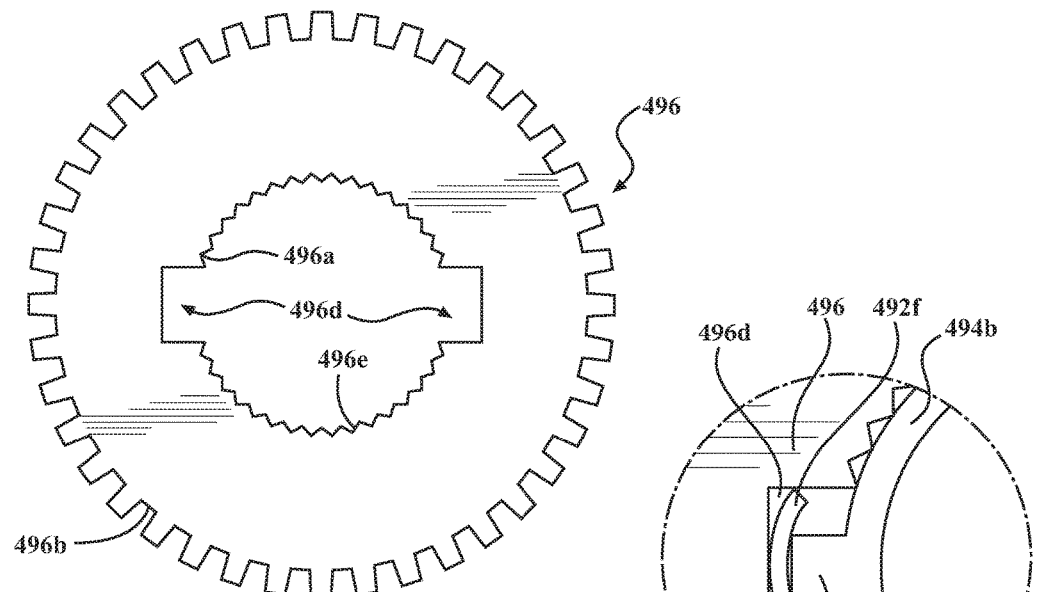
FIG. 6D is a plan view of a gear plate member of the drive gear assembly according to the embodiment shown in FIG. 6A.
Figure 6E:
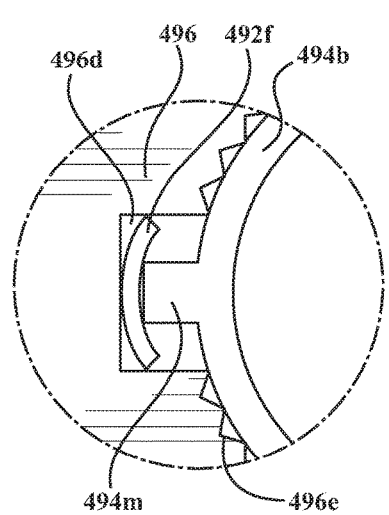
FIG. 6E is a detail view of the drive gear assembly taken from window 6E in FIG. 6A.

As shown in FIGS. 6A and 6D, the gear plate 496 includes splines 496*e* protruding radially inward from the inner periphery 496*a* of the gear plate 496 to engage and fixedly couple to the annular body 494*b* of the hub 494. More particularly, the splines 496*e* are cutting spline teeth, which are configured to embed and cut into the surface of the annular body 464*b* of the hub 494 as the gear plate 496 is pressed thereon. The gear plate 496 and its splines 496*e* are formed from a material that is harder than the hub 494 and its annular body 494*b* to facilitate the embedding and cutting of the splines 496*e* into the annular body 494*b*. Additionally, the splines 496*e* may be configured to remove material of the annular body 494*b* of the hub 494 during the pressing operation, which may prevent or limit unintended deformation of the hub 494 or gear plate 496. During operation of the drive gear assembly 490, the splines 496*e* transfer torque from the gear plate 496 to the hub 494. As described above, torque may also be transferred between the gear plate 496 and the hub 494 by way of bosses 494*m* engaging the slot 496*d* of the gear plate 496 and/or the tabs 492*f* of the sense plate 492.

Alternatively, the material forming the gear plate 496 may lack sufficient strength relative to the hub 494 for splines 496*e* capable of cutting the material of the hub 494. The splines 496*e* may be another type of spline, for example, instead being configured to compress the annular body 494*b* of the hub 494 when the gear plate 496 is pressed onto the annular body 494*b*. According to other exemplary embodiments, the hub 494 and gear plate 496 may instead, or additionally, include other mating bosses and receiving slots (not shown; refer to alignment spline 394*k* of hub 394 and alignment slot 396*c* of gear plate 396 above) configured for alignment and/or transferring torque therebetween. In still other embodiments, splines may instead be provided on the annular body 494*b* of the hub 494 (not shown; refer to splines 394*j* in FIG. 5) that elastically/plastically deform or cut the gear plate 496, while a tabbed connection is still provided between the sense plate 492 and gear plate 496.

According to another exemplary embodiment, as shown in FIGS. 7A-7E, a sense plate 592, hub 594, and gear plate 596 are configured similar to the drive gear assembly 490. However, the sense plate 592 is coupled to the gear plate 596 in a different manner with the sense plate 592 having tabs 592*f* circumferentially-spaced positioned radially between the inner periphery 592*b* and the outer periphery 592*e* of the sense plate 592, while the gear plate 596 includes circumferentially-spaced slots or apertures 596*d* positioned radially between an inner periphery 596*a* and an outer periphery 596*b*. Each tab 592*f* is folded over a radially extending edge of the aperture 596*d* corresponding thereto, such that its end engages a planar surface of the gear plate 596. The tabs 592*f*, thereby, fixedly couple the sense plate 592 directly to the gear plate 596 and transfer torque therebetween.

As with the hub 394, the hub 594 may define a slot 594*c* having end walls that engage followers 374*a* of the secondary torque transfer actuation mechanism 370 for operation thereof. As with the flange 392*d* of the sense plate 392, the flange 592*d* of the sense plate 592 may engage the torsion spring 386 of the gear reduction actuator mechanism 380 for operation thereof.

Figure 7A:
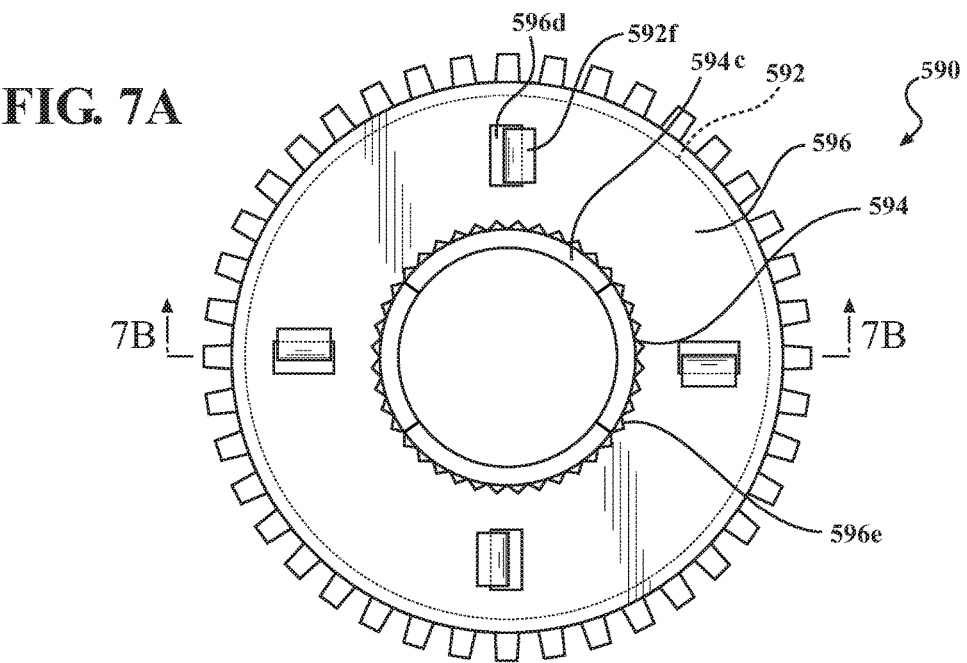
FIG. 7A is a plan view of a drive gear assembly of an actuation system for a transfer case according to an exemplary embodiment.
Figure 7B:
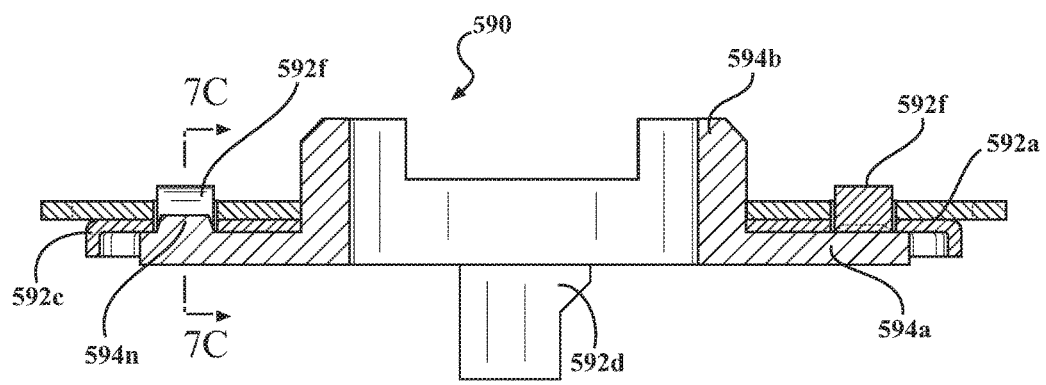
FIG. 7B is a cross-sectional view of the drive gear assembly taken along line 7B-7B in FIG. 7A.
Figure 7C:
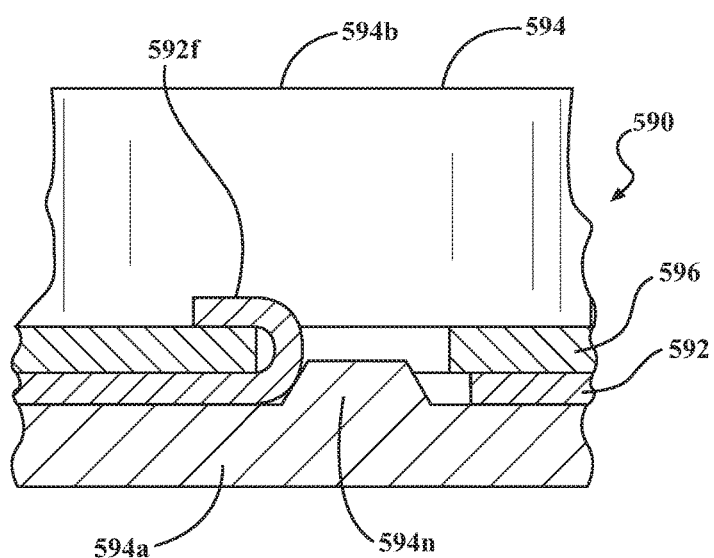
FIG. 7C is a partial cross-sectional view of the drive gear assembly taken along line 7C-7C in FIG. 7B.
Figure 7D:
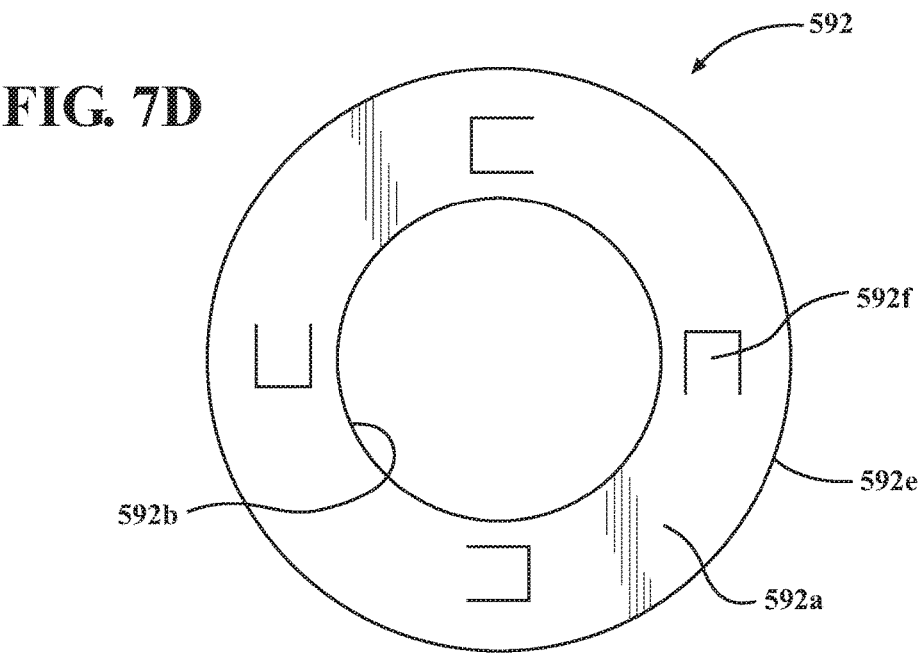
FIG. 7D is a plan view of a gear plate member of the drive gear assembly according to the embodiment shown in FIG. 7A.

As shown in FIG. 7C, each tab 592*f* is integral with the sense plate 592, for example, being formed in the material of the sense plate 592 during a stamping or machining operation. Each tab 592*f* extends in a generally circumferential direction, and includes two edges extending in the circumferential direction and a radially extending end that connects the two edges. The tabs 592*f* originate from a radially extending portion of continuous material with the remainder of the sense plate 592. Prior to or during connection of the sense plate 592 to the gear plate 596, the tabs 592*f* are bent in an axial direction opposite the flanges 592*c*, 592*d*, so as to be receivable or received within the apertures 596*d* of the gear plate 596. The tabs 592*f* may be further bent so as to engage a planar surface of the gear plate 596.

The hub 594 may include bosses 594*n* formed on a base portion 594*a*, which may function to locate the hub 594 relative to the sense plate 592 and the gear plate 596 and may also function to facilitate bending of the tabs 592*f* into and through the apertures 596*d* of the gear plate. For example, as the sense plate 592 and the gear plate 596 are pressed onto an annular body 594*b* of the hub 594, the bosses 594*n* press against the tabs 592*f* to bend the tabs 592*f* into the apertures 596*d*. A secondary operation, such as another pressing operation, may bend the tabs 592*f* further radially outward and/or into engagement with a planar surface of the gear plate 596 to, thereby, couple the sense plate 592 to the gear plate 596 and thereafter transfer torque therebetween. The bosses 594*n*, being positioned within the apertures 596*d* of the gear plate 596 and in the voids of the sense plate 592 left by the tabs 592*f*, may also engage the sense plate 592 and gear plate 596 to transfer torque to and from the hub 594. Alternatively, the sense plate 592 may be coupled to the gear plate 596 during a separate operation, such that the subassembly of the sense plate 592 and the gear plate 596 may be later coupled to the hub 594 during a separate operation (e.g., pressing the subassembly onto the annular body 594*b* of the hub 594).

Figure 7E:
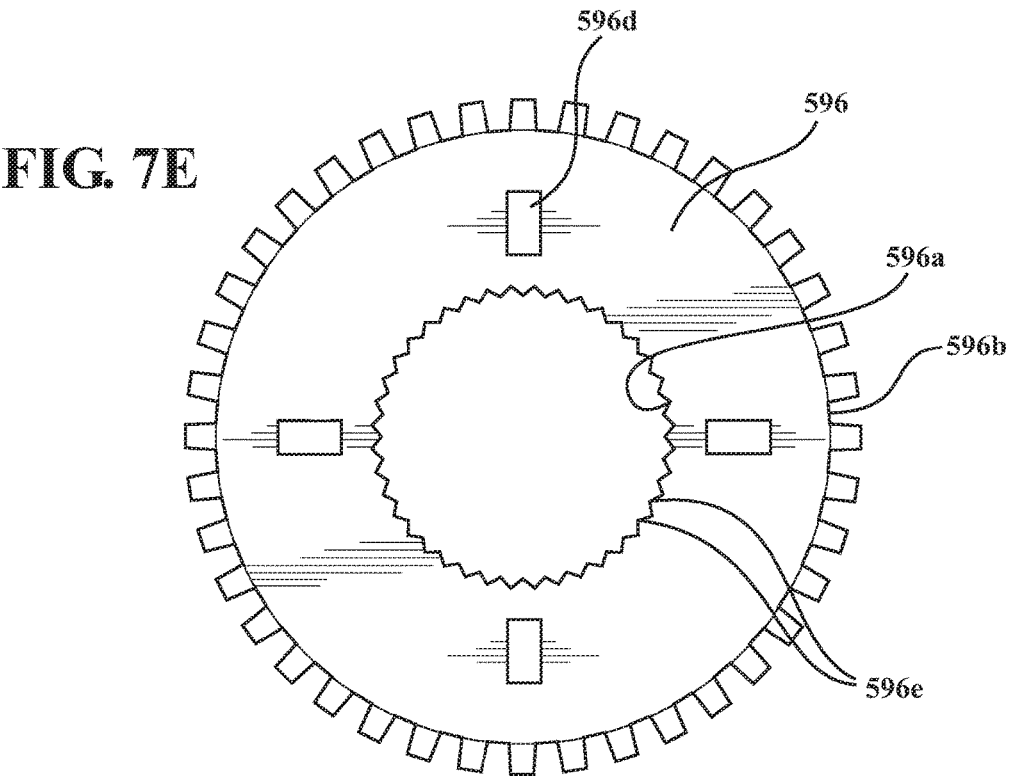
FIG. 7E is a plan view of a gear plate member of the drive gear assembly according to the embodiment shown in FIG. 7A.

As shown in FIGS. 7A and 7E, the hub 594 and gear plate 596 may be configured to couple to each other in substantially the same manner as the hub 494 and gear plate 496 discussed previously, for example, with the gear plate 596 having splines 596*e* configured to embed and cut into the annular body 594*b* of the hub 594.

While the disclosure has been made in connection with what is presently considered to be the most practical and preferred embodiment, it should be understood that the disclosure is intended to cover various modifications and equivalent arrangements.

What is claimed is:
1. A transfer case comprising:
   an input shaft;

a primary output shaft coupled to the input shaft with a gear reduction mechanism selectively between a first drive ratio and a second drive ratio;

a secondary output shaft selectively coupleable to the primary output shaft with a secondary torque transfer mechanism to transfer torque from the primary output shaft to the secondary output shaft; and an actuator comprising:
- a first actuation mechanism configured to operate the gear reduction mechanism to couple the input shaft to the primary output shaft in the first drive ratio or the second drive ratio;
- a second actuation mechanism configured to operate the secondary torque transfer mechanism to selectively transfer torque between the primary output shaft and the secondary output shaft;
- a motor; and
- a drive gear assembly having a gear plate member configured to be rotated by the motor, a sense plate member being configured to engage the first actuation mechanism to operate the gear reduction mechanism, and a hub member being configured to engage the second actuation mechanism to operate the secondary torque transfer mechanism;
- wherein the sense plate member and the hub member are each coupled directly to the gear plate member to rotate in unison with the gear plate member.

2. The transfer case according to claim 1, wherein the sense plate member includes tabs received within corresponding slots of the gear plate member to fixedly couple the sense plate member to the gear plate member.

3. The transfer case according to claim 2, wherein each tab is compressed between edges of the gear plate member defining the slot.

4. The transfer case according to claim 2, wherein the sense plate member includes a center aperture defined by an inner periphery, and the tabs are circumferentially spaced about the inner periphery.

5. The transfer case according to claim 4, wherein each tab is bent axially to form a slot in the inner periphery of the sense plate, and the hub includes an annular body received within the center aperture of the sense plate, the annular body including a boss corresponding to each slot and extending radially outward from the annular body into the slot corresponding therewith.

6. The transfer case according to claim 4, wherein the sense plate member is a stamped steel member.

7. The transfer case according to claim 1, wherein the gear plate member is coupled to the hub member with a splined connection.

8. The transfer case according to claim 7, wherein the gear plate member includes a central aperture defined by an inner periphery of the gear plate member, an annular body of the hub member being press-fit into the central aperture.

9. The transfer case according to claim 8, wherein the gear plate member includes splines extending inwardly from the inner periphery and being engaged with the annular body of the hub member.

10. The transfer case according to claim 9, wherein the splines are formed from a material that is harder than another material forming the annular body engaged by the splines.

11. The transfer case according to claim 1, wherein the motor is configured to rotate the drive gear assembly in a first range of motion in which the first actuation mechanism moves a reduction hub to select the first drive ratio and the second drive ratio, and in a second range of motion after the first range of motion in which the second actuation mechanism compresses a plate clutch of the secondary torque transfer mechanism to transfer torque from the primary output shaft to the secondary output shaft.

12. The transfer case according to claim 1, wherein the first actuation mechanism is a barrel cam mechanism, and the second actuation mechanism is a face cam mechanism.

13. The transfer case according to claim 12, wherein components of the barrel cam mechanism and the face cam mechanism generally surround the primary output shaft.

14. An actuator for a transfer case comprising:
- a first actuation mechanism configured to operate a gear reduction mechanism of the transfer case;
- a second actuation mechanism configured to operate a secondary torque transfer mechanism of the transfer case; and
- a drive gear assembly having a gear plate member configured to be rotated by a motor, a sense plate member being configured to engage the first actuation mechanism to operate the gear reduction mechanism, and a hub member being configured to engage the second actuation mechanism to operate the secondary torque transfer mechanism;
- wherein the sense plate member and the hub member are each directly coupled to the gear plate member to rotate in unison with the gear plate member.

15. The actuator according to claim 14, wherein the gear plate member is a generally planar member having a central aperture, the sense plate member includes a generally planar portion having another central aperture, and the hub member includes a circumferential flange and an annular body extending from an inner periphery of the circumferential flange, the annular body of the hub member being positioned in the central apertures of the gear plate member and the sense plate member, and the sense plate member being positioned against the circumferential flange of the hub member.

16. The actuator according to claim 15, wherein the sense plate includes tabs circumferentially spaced about the planar portion, and the gear plate includes slots circumferentially spaced thereabout, each tab being bent through one of the slots to engage the gear plate and thereby couple the sense plate to the gear plate.

17. The actuator according to claim 16, wherein each tab is in compression within the slot.

18. The actuator according to claim 15, wherein the gear plate member includes an inner periphery defining the central aperture, the inner periphery including splines that engage the annular body of the hub to thereby fixedly couple the gear plate to the hub member.

19. The actuator according to claim 18, wherein the splines are formed from a material that is harder than another material forming the annular body.

* * * * *